(12) United States Patent
Cavill

(10) Patent No.: US 7,339,113 B2
(45) Date of Patent: Mar. 4, 2008

(54) PROTECTIVE DEVICE

(75) Inventor: Brian Arthur Cavill, New South Wales (AU)

(73) Assignee: VSL Australia PTY Ltd, Thornleigh (AU)

( * ) Notice: Subject to any disclaimer, the term of this patent is extended or adjusted under 35 U.S.C. 154(b) by 24 days.

(21) Appl. No.: 10/535,405

(22) PCT Filed: Nov. 21, 2003

(86) PCT No.: PCT/AU03/01565

§ 371 (c)(1),
(2), (4) Date: May 18, 2005

(87) PCT Pub. No.: WO2004/048832

PCT Pub. Date: Jun. 10, 2004

(65) Prior Publication Data

US 2006/0051035 A1    Mar. 9, 2006

(30) Foreign Application Priority Data

Nov. 25, 2002   (AU)   ............................. 2002952900

(51) Int. Cl.
*H02R 15/04* (2006.01)
*F16L 11/00* (2006.01)
(52) U.S. Cl. ........................................ 174/74; 138/110
(58) Field of Classification Search ............... None
See application file for complete search history.

(56) References Cited

U.S. PATENT DOCUMENTS

| | | | |
|---|---|---|---|
| 4,718,965 A | 1/1988 | Finsterwalder et al. | |
| 5,174,077 A | 12/1992 | Murota | |
| 6,250,406 B1 | 6/2001 | Luke | |
| 6,407,338 B1 | 6/2002 | Smith | |
| 6,431,216 B1 * | 8/2002 | Briscoe | 138/110 |
| 6,730,846 B1 * | 5/2004 | Muller | 174/74 R |
| 2002/0100517 A1 | 8/2002 | Somerville et al. | |

FOREIGN PATENT DOCUMENTS

| | | |
|---|---|---|
| DE | 27 36 084 | 2/1978 |
| DE | 41 13375 | 10/1991 |
| EP | 0 173 350 | 3/1986 |
| GB | 1 538 550 | 1/1979 |

(Continued)

OTHER PUBLICATIONS

Abstract, Derwent Abstract Accession No. 91-363704/05, Class Q41, FR 2660332 A, Oct. 4, 1991.
Abstract, Derwent Abstract Accession No. 91-326805/45, Class Q43, DE 4113375 A, Oct. 31, 1991.

(Continued)

*Primary Examiner*—Sung Pak
*Assistant Examiner*—Hoang Tran
(74) *Attorney, Agent, or Firm*—Steptoe & Johnson LLP

(57) ABSTRACT

A protective device for use in the protection of at least a portion of an elongated article which includes a main body, first and second parts which are connectible together such that, in an assembled position, the main body has a chamber therein. The first and second parts each have two longitudinal extending side portions, respective side edge portions of the first part being adapted to cooperate with the respective side edge portions of the second part to connect the two parts together in the assembled position.

10 Claims, 4 Drawing Sheets

FOREIGN PATENT DOCUMENTS

| | | |
|---|---|---|
| JP | 58-079696 | 11/1984 |
| JP | 6-173180 | 6/1994 |
| WO | WO 00/02296 | 1/2000 |

OTHER PUBLICATIONS

Abstract, Derwent Abstract Accession No. 86-063320/10, Class Q41, EP 173350 A, Mar. 4, 1986.

* cited by examiner

PROTECTIVE DEVICE

The present application is based on International Application PCT/AU2003/001565, filed Nov. 21, 2003, which application is incorporated herein by reference in its entirety.

The present invention relates to protective devices suitable for use with elongated articles such as for example, cables including stay cables for bridges, steel hangers for bridges, telecommunication cables, power cables and piles supporting structures.

Articles of the type described exemplified above can deteriorate significantly if they are subject to adverse conditions such as fire, explosion, impact or environmental conditions.

It is an object according to one aspect of the present invention to provide an improved protective device which can provide at least some protection against one or more of the aforementioned conditions.

It is an object according to another aspect of the present invention to provide an improved method of installing a protective device.

According to one aspect of the present invention there is provided a protective device for use in the protection of at least a portion of an elongated article, the protective device including a main body, first and second parts which are connectible together such that, in an assembled position the main body has a chamber therein, the first and second parts each having two longitudinal extending side edge portions respective side edge portions of the first part being adapted to cooperate with respective side edge portions of the second part to connect the two parts together in the assembled position. When fitted at least a portion of the article to be protected is disposed within the chamber.

The main body may be open at one or both ends and may be in the form of a tubular member. In some applications the chamber may be filled, after installation with a material such as insulation or cement grout. The two parts are formed as separable sections of the tubular member, the side edge portions extending from one end of the tubular member to the other. The inner surface of the tubular member forms the inner side wall of the chamber.

In one form, the cooperating side edge portions of the first and second parts may be arranged to overlap when in the assembled position. The first and second parts may be partially circular when viewed in cross-section, the first part comprising a major segment of a circle and the second part forming a minor segment of a circle. The side edge portions of the first or second part may include a recessed section for receiving the side edge portion of the other part. It will be appreciated that the first and second parts may be of any other suitable cross-sectional shape. For example, in the assembled position, they may form a square, rectangle, hexagon or the like.

One of the ends of the main body may be belled for receiving the other end of an adjacent device.

Thermal insulation may be provided on the internal surface of one or both parts of the main body. A locating element may be provided which projects from the inner wall of one of the two parts.

The first and second parts are connected together by relative movement in the axial direction so as to adopt the assembled position.

The main body may be formed from any suitable material. One preferred form of material is known as reactive powder concrete or ultra high performance fibre reinforced concrete. An example of such a preferred type of material is DUCTAL™. DUCTAL is a cementitious material which is used in a wide variety of structural applications. Various forms of the material are the subject of Australian Patent Specifications Numbers 678271, 682198, 750873, 748678 and 2001235632. The contents of these specifications is incorporated herein by of cross reference.

The device in its preferred form has several advantages. For example, it can provide for fire protection of the part being protected. It can also provide mechanical protection against impact and explosion, caused by vandalism, accident, terrorism and similar action. It requires little maintenance, is extremely durable and will never need replacing. Is easy to install and can be installed during or after construction and without dismantling the existing elongated articles. It can be dismantled and removed then reinstalled, if required for the inspection of the structure or facility. It has concealed connections. It has a clean appearance, with no external projections.

Preferred embodiments of the invention will be hereinbefore described with reference to the accompanying drawings, and in those drawings.

Figure 1:
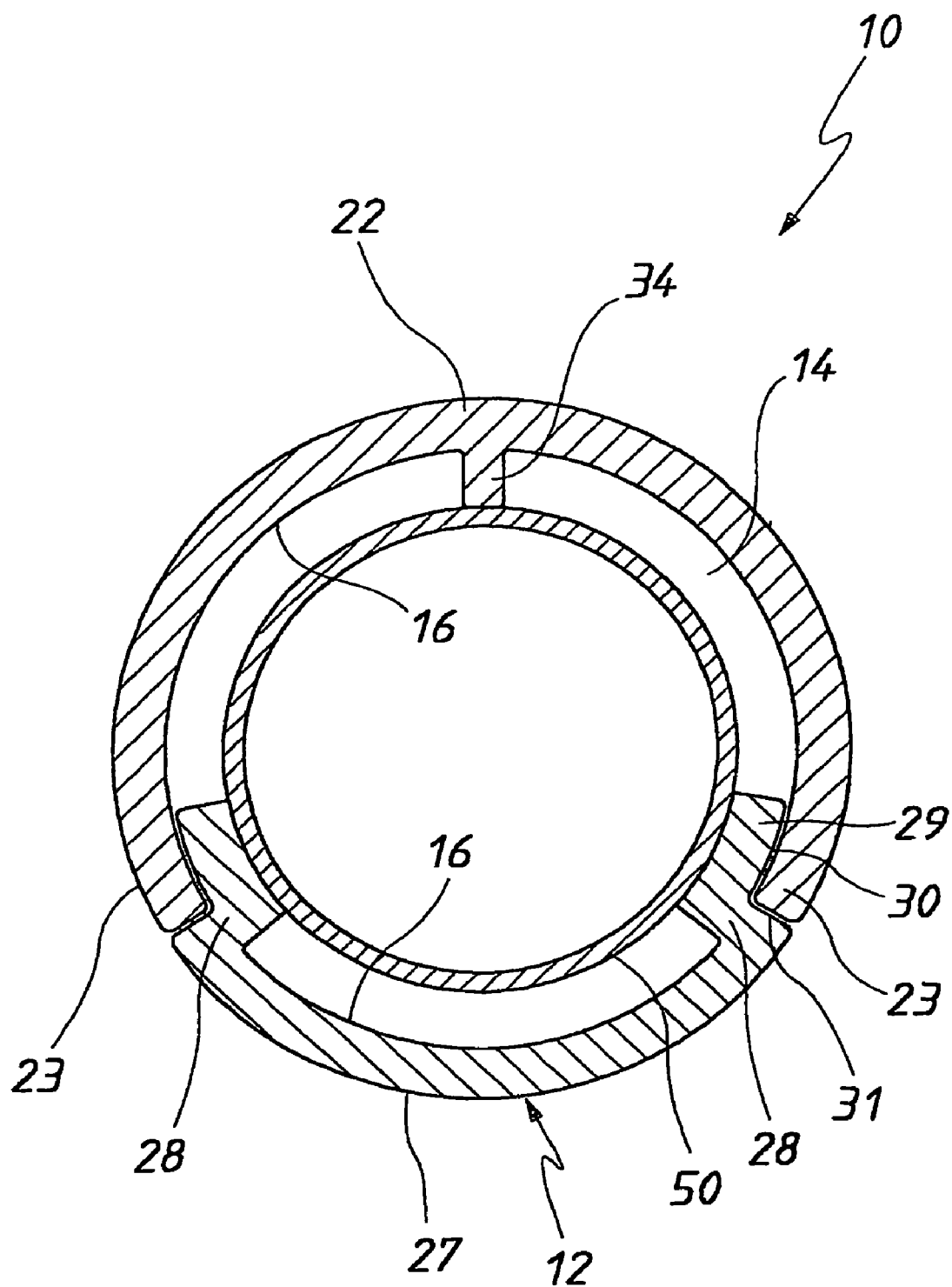
FIG. 1 is a schematic end view of a protective device according to a first embodiment in an installed position.

Referring to the drawings, there is shown a protective device 10 in an installed position on a cable stay 50. The device 10 includes a main body 12 in the form of a tubular body having an internal chamber 14 therein, the tubular body being open at both ends. The main body 12 includes two parts 22 and 27 each having respective side edge portions 23 and 28 which are adapted to cooperate with one another to connect the two parts together in an assembled position. The two parts 22 and 27 are formed by segments of circle, the first part being a major segment and the second part being a minor segment.

Figure 2:
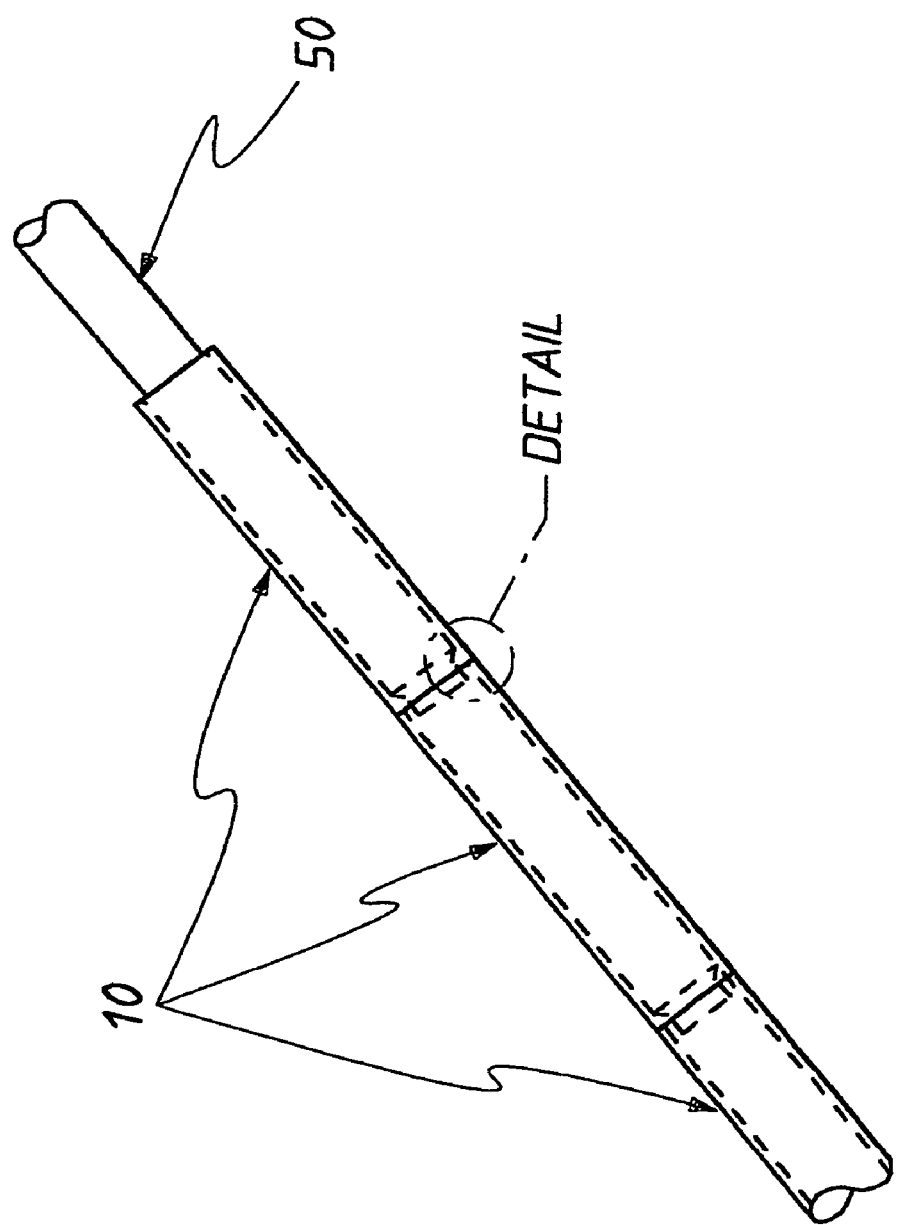
FIG. 2 is a schematic side elevation of a series of protective devices in an installed position.

The side edge portions 23 of the first part are in essence a continuation of the side wall of the body although in the embodiment of FIG. 2, a small recess 24 is provided in the inner wall surface 16 so as to form a locating shoulder 30. The side edge portions 28 of the second part include an inwardly stepped section 29 forming a recess 30 and shoulder 31. A locating flange 34 is provided on the inner wall surface 16 of the first part. It will be appreciated that the connecting parts could be oppositely disposed so that the inner wall surface is smooth with the overlapping sections being on the outside of the outer wall surface.

In the second embodiment insulating material 38 is secured to the inner wall surface of the main body.

Figure 3:
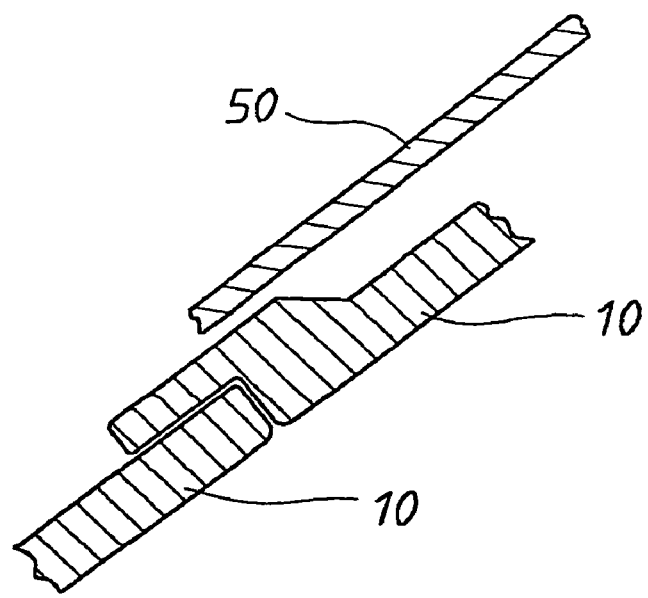
FIG. 3 is a detail schematic partial view o a junction between adjacent devices.
Figure 5:
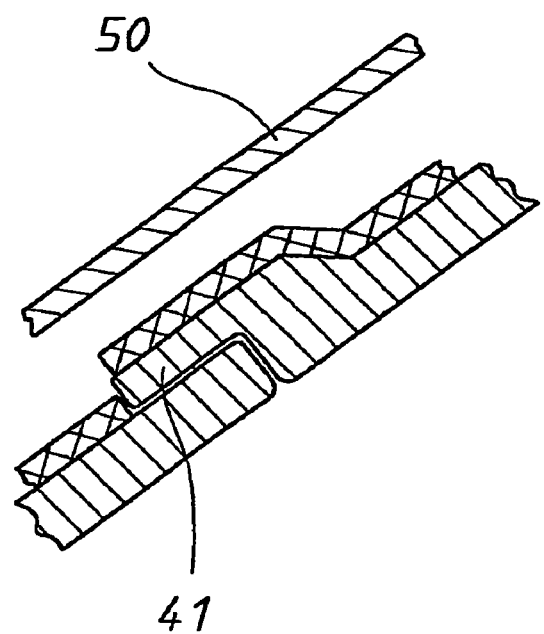
FIG. 5 is a similar view to FIG. 3 of the second embodiment.
Figure 4:
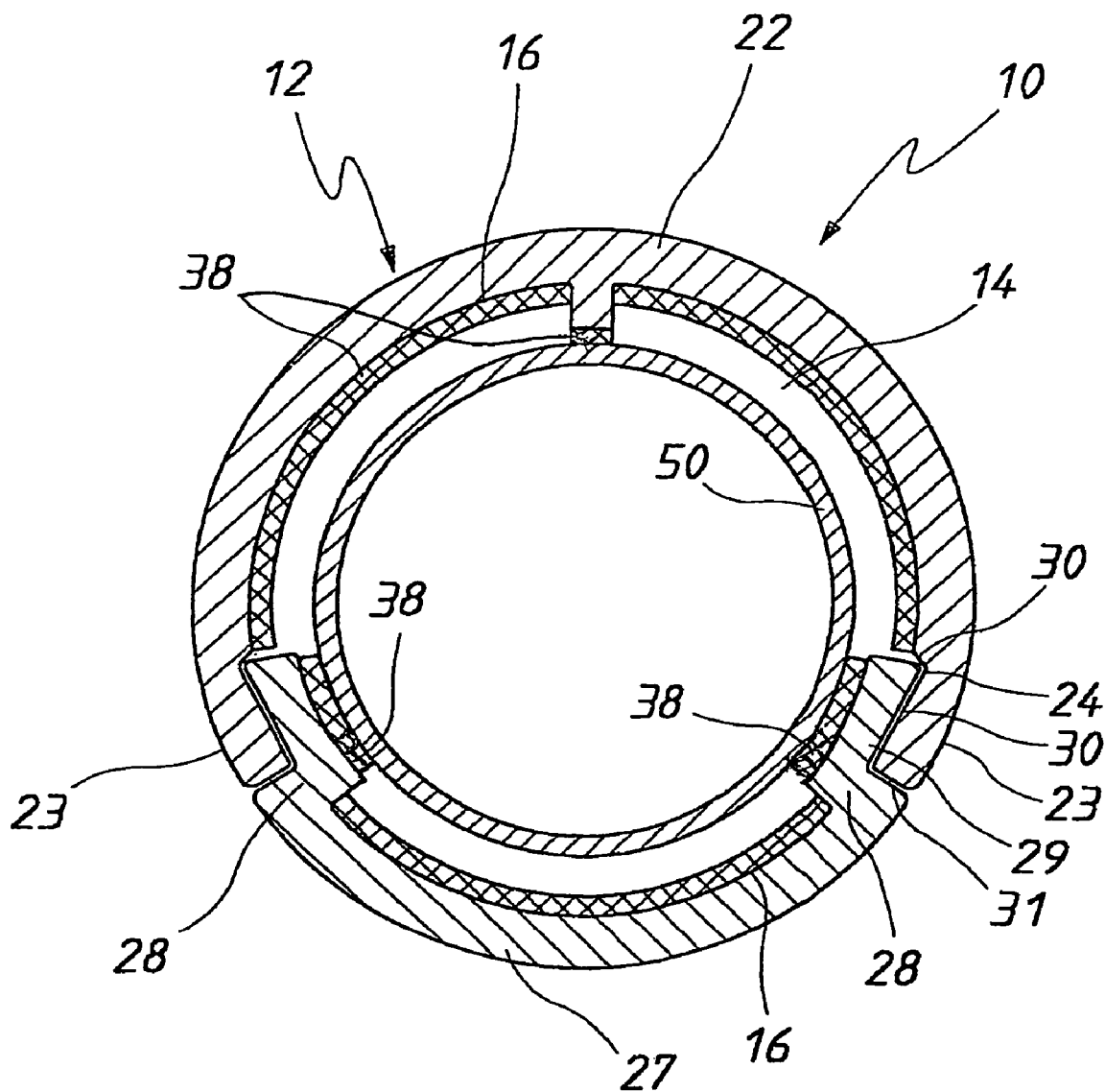
FIG. 4 is a similar view as FIG. 1 of a second embodiment.

As best seen in FIGS. 3 and 5, one end of the main body has a bell end flange 41 thereon to enable fitted connection of adjacent devices. FIG. 2 illustrates a number of devices fitted together on a cable stay 50.

The two parts of the main body can be fitted together by sliding movement of the two parts relative to one another in the axial direction. To fit the device in position one part is located in the stay. Thereafter the second part is positioned on the opposite side of the stay and then slid into the final interlocked position. If desired the space between the article being protected and the main body of the device may be filled with material such as insulation or cement grout.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

Finally, it is to be understood that various alterations, modifications and/or additions may be incorporated into the various constructions and arrangements of parts without departing from the spirit or ambit of the invention.

The invention claimed is:

1. A protective device for use in the protection of at least a portion of an elongated article, the protective device including a main body, first and second parts which are connectible together such that, in an assembled position the main body has a chamber therein, with opposed ends and a central longitudinal axis extending between the opposed ends, the first and second parts each having two longitudinal extending side edge portions which extend generally parallel with the longitudinal axis, are respective side edge portions of the first part being adapted to cooperate with respective side edge portions of the second part to connect the two parts together in the assembled position, said first and second parts overlapping when in the assembled position and being connected together by relative movement in the axial direction so as to adopt the assembled position, said first and second parts being partially circular when viewed in cross-section, the first part comprising a major segment of a circle and the second part forming a minor segment of a circle, and said side edge portions of the first or second part including a recessed section which substantially extends from one end thereof to the other for receiving the side edge portion of the other part.

2. A protective device according to claim 1 wherein when in the assembled position the main body is open at at least one end.

3. A protective device according to claim 1 wherein when in the assembled position the main body is open at both ends.

4. A protective device according to claim 1 wherein one of the ends of the main body is belied for receiving the other end of an adjacent device.

5. A protective device according to claim 1 further including insulation on the internal surface of one or both parts of the main body.

6. A protective device according to claim 1 further including a locating element which projects from the inner wall of one of the two parts.

7. A protective device according to claim 1 wherein the main body of the device is formed from material known as reactive powder concrete or ultra high performance fiber reinforced concrete.

8. A protective device according to claim 1 wherein the main body of the device is formed from material known as ultra high performance fiber reinforced concrete.

9. A protective device according to claim 8 wherein the fiber is a high carbon metallic fiber.

10. A protective device according to claim 8 wherein the fiber is a poly-vinyl alcohol fiber.

* * * * *